United States Patent [19]
Phinney et al.

[11] Patent Number: 6,106,796
[45] Date of Patent: Aug. 22, 2000

[54] METHOD OF AMMONIUM SULFATE PURIFICATION

[75] Inventors: Robin Phinney; Mark Hantke, both of Calgary, Canada

[73] Assignee: Airborne Technologies Inc., Calgary, Canada

[21] Appl. No.: 09/310,995

[22] Filed: May 13, 1999

Related U.S. Application Data

[60] Provisional application No. 60/103,968, Oct. 13, 1998.

[51] Int. Cl.$^7$ .................................. C01D 7/00; C01C 1/24
[52] U.S. Cl. ..................... 423/545; 423/422; 423/423; 423/428; 423/548; 423/551
[58] Field of Search ................................ 423/422, 423, 423/428, 545, 548, 551

[56] References Cited

U.S. PATENT DOCUMENTS

| | | | |
|---|---|---|---|
| 1,979,151 | 10/1934 | Fricke et al. | 23/63 |
| 3,423,171 | 1/1969 | Hoppe et al. | 23/121 |
| 3,429,657 | 2/1969 | George et al. | 23/63 |
| 3,493,329 | 2/1970 | Stiers | 23/63 |
| 3,528,767 | 9/1970 | Garrett | 23/89 |
| 3,578,399 | 5/1971 | Boeglin | 23/121 |
| 3,656,891 | 4/1972 | Chemtob | 23/59 |
| 3,687,639 | 8/1972 | Barlow et al. | 23/300 |
| 3,711,254 | 1/1973 | McGowan et al. | 23/313 |
| 3,728,438 | 4/1973 | Nasyrov | 423/551 |
| 3,843,772 | 10/1974 | Boeglin | 423/551 |
| 3,853,490 | 12/1974 | Boeglin et al. | 23/313 |
| 3,967,930 | 7/1976 | Sadan | 23/296 |
| 3,983,211 | 9/1976 | Nasyrov et al. | 423/128 |
| 3,984,521 | 10/1976 | Nasyrov et al. | 423/120 |
| 3,998,935 | 12/1976 | Adams et al. | 423/552 |
| 4,045,543 | 8/1977 | Sardisco | 423/482 |
| 4,129,642 | 12/1978 | Neitzel | 423/199 |
| 4,174,382 | 11/1979 | Menche | 423/552 |
| 4,215,100 | 7/1980 | Sokolov et al. | 423/552 |
| 4,268,492 | 5/1981 | Sardisco | 423/482 |
| 4,303,619 | 12/1981 | Kobayashi et al. | 422/205 |
| 4,342,737 | 8/1982 | Iwashita et al. | 423/522 |

(List continued on next page.)

FOREIGN PATENT DOCUMENTS

| | | | |
|---|---|---|---|
| 821457 | 8/1969 | Canada | 23/94 |
| 2032627 | 12/1990 | Canada | 23/19 |
| 717230 | 10/1966 | Italy . | |

OTHER PUBLICATIONS

Mullin, J.W., Crystallization, London, Butterworths 1961, p. 85–95.

A.P. Belopol'sky, An Ammonia–Soda Process Based on Mirabilite, Scientific Institute for Fertilizers, Insecticides and Fungicides delivered at the International Congress on Industrial Chemistry in Brussels (Sep. 24, 1935).

*Primary Examiner*—Steven P. Griffin
*Assistant Examiner*—Timothy C Vanoy
*Attorney, Agent, or Firm*—Paul S. Sharpe; Marks & Clerk

[57] ABSTRACT

A process is provided for recovering sodium bicarbonate and ammonium sulfate from a solution containing sodium sulfate derived from a process for removing sulfur contaminants out of a gas with sodium bicarbonate reagent. Sodium bicarbonate is precipitated and removed from the solution. Sodium sulfate or ammonium bicarbonate is added to the solution to form a second precipitate of sodium bicarbonate, which is removed from the solution. The solution is conditioned by either heating the solution to 95° C. to liberate ammonia and carbon dioxide or by adding sulfuric acid to the solution to decompose any carbonates. The solution is cooled to a temperature between −2 to 2° C. to form a third precipitate of sodium bicarbonate. Sulfuric acid is added to the solution to decompose any carbonate minerals, and purified ammonium sulfate solution is recovered.

22 Claims, 4 Drawing Sheets

U.S. PATENT DOCUMENTS

| | | | |
|---|---|---|---|
| 4,371,512 | 2/1983 | Sardisco et al. | 423/551 |
| 4,420,468 | 12/1983 | Yamashita et al. | 423/482 |
| 4,436,710 | 3/1984 | Miyazaki et al. | 423/552 |
| 4,533,536 | 8/1985 | Bichara et al. | 423/551 |
| 4,554,151 | 11/1985 | Worthington et al. | 423/551 |
| 4,562,058 | 12/1985 | Dancy et al. | 423/551 |
| 4,588,573 | 5/1986 | Worthington et al. | 423/552 |
| 4,668,242 | 5/1987 | Vitellaro et al. | 23/313 |
| 4,707,347 | 11/1987 | Vajna | 423/552 |
| 4,844,874 | 7/1989 | de Vries | 423/210 |
| 5,135,734 | 8/1992 | Ninane | 423/659 |
| 5,298,050 | 3/1994 | McLaughlin et al. | 71/63 |
| 5,366,534 | 11/1994 | Fischbein et al. | 71/63 |
| 5,529,764 | 6/1996 | Lampert et al. | 423/552 |
| 5,549,876 | 8/1996 | Zisner et al. | 423/199 |
| 5,552,126 | 9/1996 | Efraim et al. | 423/199 |
| 5,654,351 | 8/1997 | Kresnyak et al. | 423/423 |
| 5,830,422 | 11/1998 | Kresnyak et al. | 423/243.08 |

METHOD OF AMMONIUM SULFATE PURIFICATION

This application claims the benefit of U.S. Provisional Application No. 60/103,968 filed Oct. 13, 1998.

FIELD OF THE INVENTION

The present invention relates to a method of purifying ammonium sulfate and more particularly, the present invention relates to a method of forming high purity ammonium sulfate with sodium sulfate and sodium bicarbonate by progressive precipitation without high energy input.

BACKGROUND OF THE INVENTION

The preparation of sodium bicarbonate and ammonium sulfate has been discussed at length in the prior art. One of the most recent patents regarding this technology is Canadian Patent No. 2,032,627, issued Jan. 14, 1997 to Thompson et. al.

This reference teaches a process for producing sodium carbonate and ammonium sulfate from naturally occurring sodium sulfate. The reference is also concerned with the preparation of a double salt of sodium and ammonium sulfate. This is a source of contamination when one is trying to form reasonably pure ammonium sulfate and the presence of any double salt and sodium in an ammonium sulfate product does nothing other than reduce the value of the ammonium sulfate to a non-commercial product. In the methodology, it is clearly stated on page 13, beginning at line 8:

" . . . the brine remaining after screening off the solid sodium bicarbonate contains a mixture of unreacted sodium sulfate, ammonium sulfate, ammonium bicarbonate and minor amounts of sodium bicarbonate. This brine is transferred by a pump 36 into a gas recovery boiler 31 where it is heated to a temperature of 95° to 100° C. Under these conditions, the ammonium bicarbonate breaks down and sodium bicarbonate dissolved in the brine reacts with ammonium sulfate to produce sodium sulfate, carbon dioxide and ammonia. Carbon dioxide and ammonia dissolved in the brine boil off, leaving in the solution a mixture composed mostly of sodium and ammonium sulfate. The carbon dioxide and ammonia so regenerated are cooled in a gas cooler 32 and returned to the reactor 21 by a blower 33 after being further cooled in a gas cooler 34. This regeneration step minimizes the amount of carbon dioxide and ammonia used in the process."

It is clear that the brine is evaporated and that the ammonium sulfate is reacted with the brine to produce sodium sulfate inter alia. The phase equilibria relati onship between the elements present in the system was not recognized.

The teachings of this reference only provide for a closed loop system for a sodium sulfate and ammonium sulfate saturated solution system. This system can only result in the formation of double salt. No other result is possible based on the teachings. The teachings are limited in that it was believed that the solubility difference could yield an ammonium sulfate product. This is incorrect; the result is an ammonium sulfate contaminated system.

In Stiers et al, U.S. Pat. No. 3,493,329, the teachings are directed to the preparation of sodium bicarbonate and hydrochloric acid. This goal is consistent with the teachings of Stiers et al. at column 11 of the disclosure beginning at line 23 through line 43, wherein the following is indicated:

"If, instead of precipitating the double salt in the first stage of the process, it is preferred to precipitate ammonium sulfate, the following procedure may be adopted.

Referring now to FIG. 10, it will be seen that each of the three curves which divide this figure into three parts corresponds to the simultaneous precipitation of two salts.

At any given temperature, the point representing a system may be vertically displaced by removing some of the water from the solution. In order to precipitate ammonium sulfate instead of the double salt, it is necessary to operate at a temperature greater than that at the triple point, i.e., about 59° C.

The point A, which corresponds to about 63° C. is suitable, since it is sufficiently distant from the triple point to avoid unwanted precipitation of the double salt without requiring too much heat.

It is clear that at the point A, there is simultaneous precipitation of sodium sulfate and ammonium sulfate, but this is in the form of a mixture of the two salts rather than as a double salt."

The teachings of the Stiers et al. reference not only are insufficient to direct one to formulate ammonium sulfate in a purity of greater than 75%, but the disclosure is further completely absent of any teaching on how to obtain ammonium sulfate singly. The Stiers et al. reference does not and can not result in the generation of ammonium sulfate as a single product as is clearly possible by the teachings of the present invention.

By following the Stiers et al. methodology, one cannot generate a pure ammonium sulfate product, since the reference completely fails to recognize the limitations of the phase equilibria of the salt system and the combination of steps necessary to overcome the inherent contaminating steps associated with this salt system. Although there is a reference to point A in FIG. 10 of Stiers et al. for the preparation of the product, it is clear that although no double salt is indicated to be in the mixture, there is no indication that the product does not include mixed salt. This is reflected in the disclosure where Stiers et al. indicates that there is simultaneous precipitation of sodium sulfate and ammonium sulfate. This is consistent with the data that Stiers et al. provides as indicated at column 12 beginning at line 21. There is no data presented where the quantity of ammonium sulfate, standing on its own, is set forth. In each case, the data presented is expressed as a proportion precipitated in a compound, i.e, double salt inter alia. Finally, from the text set forth beginning at line 32, Stiers et al. indicates that:

" . . . From the foregoing it will be seen that the process according to the invention may be carried out by precipitating the ammonium sulfate in the form of the double salt, or as $(NH_4)_2SO_4$ simultaneously with sodium sulfate, or by precipitating it simultaneously in the form of ammonium sulfate and in the form of the double salt."

From a review of FIGS. 10 and 11, the fact that no ammonium sulfate is generated singly becomes evident. No data is presented for ammonium sulfate generation; the results from practising this methodology are only a mixed salt and a double salt. Nothing else is obtainable by practising this method.

Finally, Kresnyak et al. in U.S. Pat. No. 5,830,442, issued Nov. 3, 1998, teach an improved process for producing ammonium sulfate. This process is attractive where energy consumption and conversion efficiency are not of primary concern. In this process, sodium sulfate is removed by significant energy input to the evaporators with subsequent cooling. The result is a 2:1 ratio of double salt to solution which then must be evaporated in order to recover ammonium sulfate. As will be appreciated by the skilled process designer, this separation creates difficulties in terms of filtering such a significant amount of precipitated double salt. Further, the process employed the technique of redissolving the double salt and adding this to the evaporator to make sodium sulfate for the recycle stream. This procedure adds to the evaporative load of the process.

In previous attempts to maximize yields and productivity, it was not realized that the initial solution containing the sodium sulfate was undersaturated; this detail is important to perpetuating the reactions involved in synthesizing the ammonium sulfate.

In view of the limitations of the prior art, it is evident that a need remains for a process whereby ammonium sulfate can be formulated in high yield at a high purity using energy efficient unit operations in a proper sequence. The present invention fulfils these objectives in an elegant manner to formulate ammonium sulfate and United States Pharmacopoeia sodium bicarbonate.

SUMMARY OF THE INVENTION

One object of the present invention is to provide an improved process for making ammonium sulfate and industrial grade sodium bicarbonate.

A further object of one embodiment of the present position is to provide a method of recovering purified ammonium sulfate solution from a solution of sodium sulfate, carbon dioxide, ammonia or ammonium ions, comprising the steps of:

a) precipitating, in at least one precipitation operation, sodium bicarbonate precipitate to increase the concentration of ammonium sulfate in solution while reducing the concentration of sodium bicarbonate in the solution;

b) centrifuging and washing the sodium bicarbonate precipitate to convert the precipitate to industrial grade sodium bicarbonate;

c) saturating the solution from step a) with one of sodium sulfate or ammonium bicarbonate by addition of the sodium sulfate or the ammonium bicarbonate to the solution at a temperature of between 35° C. and 50° C. to form a second precipitate of sodium bicarbonate;

d) conditioning the solution from step c) by at least one of heating the solution to 95° C. to liberate ammonia and carbon dioxide and contacting the solution from step c) with sulfuric acid to degas any carbonate minerals;

e) cooling solution from step d) at a temperature between −2° C. and 2° C. to form a third precipitate of sodium bicarbonate;

f) recycling precipitates from steps d) and e) to step a);

g) treating solution from step e) with sulfuric acid to degas any remaining carbonate minerals from sodium bicarbonate and reducing the sodium sulfate to less than 7% by weight; and subsequently h) recovering purified ammonium sulfate solution.

Advantageously, the double salt encountered during the formulation of the ammonium sulfate is in a ratio of approximately 0.3:1. This has a significant bearing on energy consumption for the process. As an example, it requires approximately 5 MBtu to 7 MBtu of energy to contend with the evaporation of the solution. Clearly, where the ratio of double salt increases so does the energy input, thus reducing the efficiency of the process. In addition, where the ratio is maintained to a relatively small number, separation of the ammonium sulfate from the sodium sulfate becomes significantly easier since one does not have to contend with massive amounts of double salt solids for a small amount of liquid product. In this manner, filtration is simplified without risk of equipment failure or other complications leading to efficiency depreciation.

Another object of one embodiment of the present position is to provide a method of recovering purified ammonium sulfate solution from a solution of sodium sulfate, carbon dioxide, ammonia or ammonium ions, comprising the steps of:

a) precipitating, in at least one precipitation operation, sodium bicarbonate precipitate to increase the concentration of ammonium sulfate in solution while reducing the concentration of sodium bicarbonate in the solution;

b) centrifuging and washing the sodium bicarbonate precipitate to convert the precipitate to industrial grade sodium bicarbonate;

c) saturating the solution from step a) with one of sodium sulfate or ammonium bicarbonate by addition of the sodium sulfate or the ammonium bicarbonate to the solution at a temperature of between 35° C. and 50° C. to form a second precipitate of sodium bicarbonate;

d) conditioning the solution from step c) by at least one of heating the solution to 95° C. to liberate ammonia and carbon dioxide and contacting the solution from step c) with sulfuric acid to degas any carbonate minerals;

e) cooling solution from step d) at a temperature between −2° C. and 2° C. to form a third precipitate of sodium bicarbonate;

f) recycling precipitates from steps d) and e) to step a);

g) heating the solution from step e) to a temperature of 95° C. to convert residual sodium bicarbonate to sodium sulfate and release ammonia and carbon dioxide for recycle; and subsequently h) recovering purified ammonium sulfate solution.

A further object of one embodiment of the present invention is to provide a method of forming ammonium sulfate from sodium sulfate and sodium bicarbonate, comprising the steps of:

a) providing a solution of sodium sulfate;

b) contacting the sodium sulfate solution with carbon dioxide and ammonia or ammonium ions to form a first precipitate of sodium bicarbonate and a solution containing ammonium sulfate;

c) progressively precipitating sodium bicarbonate from the solution to increase the concentration of ammonium sulfate and reduce the concentration of sodium bicarbonate in the solution;

d) recovering as a product the first precipitate of sodium bicarbonate;

e) centrifuging and washing the first precipitate of sodium bicarbonate to convert the sodium bicarbonate into industrial hygrade sodium bicarbonate;

f) treating solution remaining from d) with sodium sulfate at a temperature of between 35° C. and 50° C. to form a second precipitate of sodium bicarbonate;

g) recovering the second precipitate of sodium bicarbonate and recycling recovered second precipitate to step b);

h) conditioning the solution from step g) by at least one of heating the solution to 95° C. to liberate ammonia and carbon dioxide and contacting the solution from step g) with sulfuric acid to degas any carbonate minerals;

i) cooling solution remaining from step h) to a temperature of between −5° C. and 2° C. to form a third precipitate of sodium bicarbonate, and precipitates of sodium sulfate and ammonium sulfate;

j) recovering the third precipitate of sodium bicarbonate and precipitates of sodium sulfate and ammonium sulfate from the solution of step i) and recycling recovered third precipitate and the precipitates of sodium sulfate and ammonium sulfate to step b);

k) treating solution remaining from step j) with sulfuric acid to degas any remaining carbonate minerals from sodium bicarbonate and reducing the sodium sulfate to less than 7% by weight; and subsequently l) recovering purified ammonium sulfate solution.

As a particularly advantageous feature of the present methodology, the solution, prior to cooling contains at least 24% ammonium sulfate which, when cooled, prevents the formation of double salt since the sodium salt is efficiently used.

A still further object of one embodiment of the present invention is to provide a method of forming ammonium sulfate from sodium sulfate and sodium bicarbonate, comprising the steps of:

a) providing a solution of sodium sulfate;

b) contacting the sodium sulfate solution with carbon dioxide and ammonia or ammonium ions to form a first precipitate of sodium bicarbonate and a solution containing ammonium sulfate;

c) progressively precipitating sodium bicarbonate from the solution to increase the concentration of ammonium sulfate and reduce the concentration of sodium bicarbonate in the solution;

d) recovering as a product the first precipitate of sodium bicarbonate;

e) centrifuging and washing the first precipitate of sodium bicarbonate to convert the sodium bicarbonate into industrial grade sodium bicarbonate;

f) treating solution remaining from d) with sodium sulfate at a temperature of 38° C. to form a second precipitate of sodium bicarbonate;

g) recovering the second precipitate of sodium bicarbonate and recycling recovered second precipitate to step b);

h) conditioning the solution from step g) by at least one of heating the solution to 95° C. to liberate ammonia and carbon dioxide and contacting the solution from step g) with sulfuric acid to degas any carbonate minerals;

i) cooling solution remaining from step h) to a temperature of 2° C. to form a third precipitate of sodium bicarbonate, and precipitates of sodium sulfate and ammonium sulfate;

j) recovering the third precipitate of sodium bicarbonate and precipitates of sodium sulfate and ammonium sulfate from the solution of step i) and recycling recovered third precipitate and the precipitates of sodium sulfate and ammonium sulfate to step b);

k) treating solution remaining from step j) with sulfuric acid to degas any remaining carbonate minerals from sodium bicarbonate and reducing the sodium sulfate to less than 7% by weight;

l) removing precipitates formed in the solution from step k); and m) recovering purified ammonium sulfate solid.

With respect to the sodium bicarbonate formulation, from centrifuging and washing the sodium bicarbonate, the result is industrial grade product according to United States Pharmacopoeia.

In a variation of the processes set forth herein, a single precipitation operation of the sodium bicarbonate may be employed rather than at least two such operations. This may be achieved by using an excess of sulfuric acid to remove carbonate compounds.

Yet another object of one embodiment of the present invention is to provide a method of forming ammonium sulfate from sodium sulfate and sodium bicarbonate, comprising the steps of:

a) providing a solution of sodium sulfate;

b) contacting the sodium sulfate solution with carbon dioxide and ammonia or ammonium ions to form a first precipitate of sodium bicarbonate and a solution containing ammonium sulfate;

c) progressively precipitating sodium bicarbonate from the solution to increase the concentration of ammonium sulfate and reduce the concentration of sodium bicarbonate in the solution;

d) recovering as a product the first precipitate of sodium bicarbonate;

e) centrifuging and washing the first precipitate of sodium bicarbonate to convert the sodium bicarbonate into industrial grade sodium bicarbonate;

f) treating solution remaining from d) with sodium sulfate at a temperature of between 35° C. and 50° C. to form a second precipitate of sodium bicarbonate;

g) conditioning the solution from step f) by at least one of heating the solution to 95° C. to liberate ammonia and carbon dioxide and contacting the solution from step f) with sulfuric acid to degas any carbonate minerals;

h) cooling solution containing the second precipitation of sodium bicarbonate from step f) to a temperature of between −5° C. and 2° C. to further precipitate of sodium bicarbonate, and form precipitates of sodium sulfate and ammonium sulfate;

i) treating the solution, the precipitate of sodium bicarbonate and the precipitates of sodium sulfate and ammonium sulfate from step h) with sulfuric acid to precipitate remaining sodium bicarbonate;

j) recovering the precipitate of sodium bicarbonate and precipitates of sodium sulfate and ammonium sulfate from the solution of step i) and recycling recovered sodium bicarbonate precipitate and the precipitates of sodium sulfate and ammonium sulfate to step b); and k) recovering purified ammonium sulfate solution.

Another object of one embodiment of the present invention is to provide a method of desulfurizing a sulfur containing gas stream, comprising:

a) exposing the stream to oxidizing conditions to generate a sulfur containing compound;

b) contacting the sulfur containing compound with sodium bicarbonate to generate sodium sulfate; and c) processing the sodium sulfate according to the method of claim 1.

Having thus described the invention, reference will now be made to the accompanying drawings illustrating preferred embodiments.

DETAILED DESCRIPTION OF THE PREFERRED EMBODIMENTS

Prior to a discussing the present invention, a general synopsis of the prior art will be made in conjunction with FIGS. 1 through 3.

Figure 1:
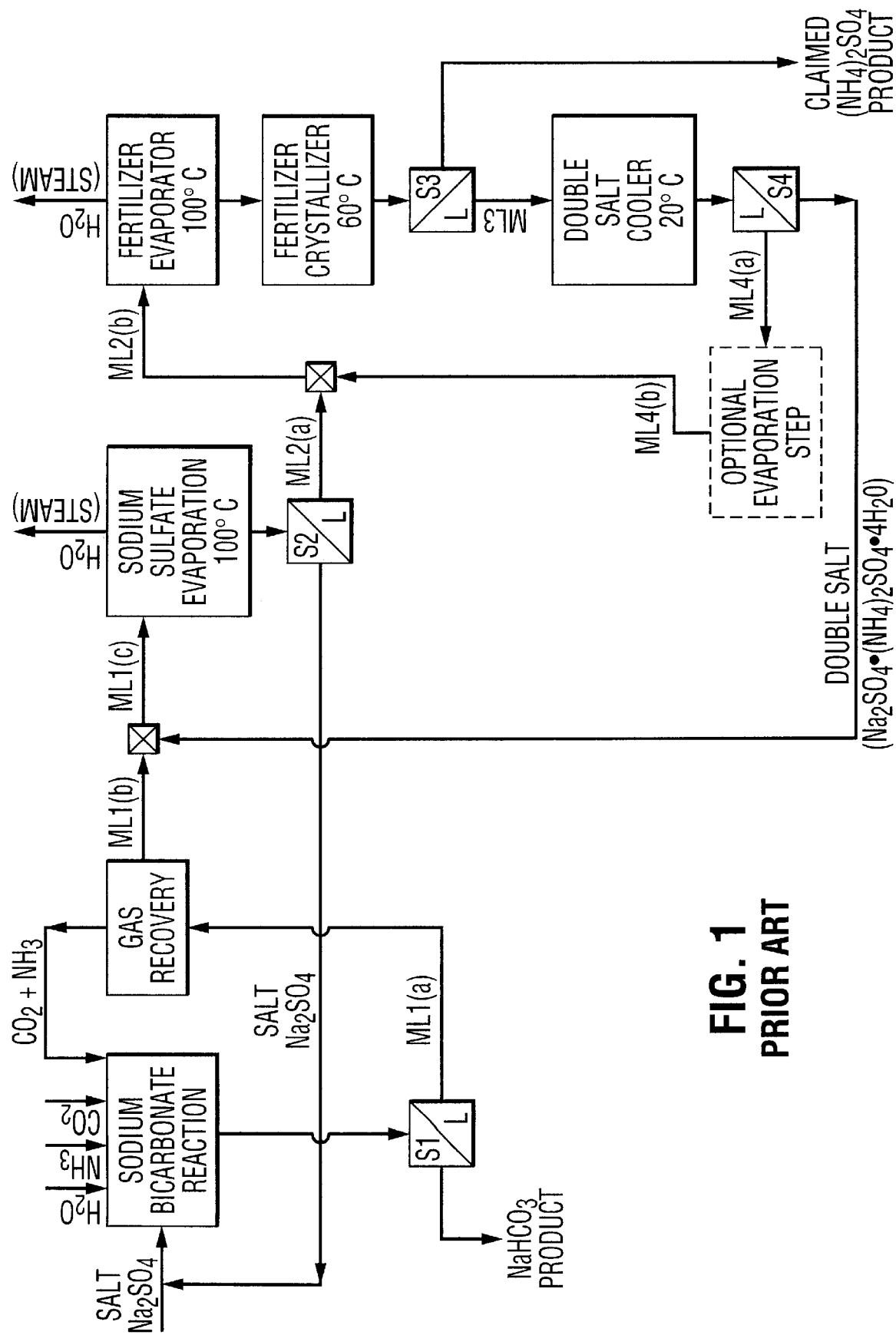
FIG. 1 is a process flow diagram according to the prior art.

FIG. 1 illustrates the process flow diagram for the Thompson et al. process.

The Thompson et al. process flow chart clearly shows the use of two fertilizer processing steps, namely, an evaporator step which elevates the temperature of mother liquor 2b (ML2b) to 100° C. and a subsequent cooling step in the fertilizer crystallizer to 60° C. The solid is removed as the claimed ammonium sulfate product while the liquor from this precipitation step is subsequently passed onto a double salt cooler at 20° C. The liquid from the double salt cooling step is then reintroduced into the fertilizer evaporator at 100° C. In the Thompson et al. process, it was believed that by employing a difference in solubility, the sodium ion would not act as a contaminant in the generation of ammonium sulfate. This has been found to be a source of complication and, in fact, the reintroduction of the liquor from the double salt cooler contains sodium and this is reintroduced into the fertilizer evaporator to contaminate the ammonium sulfate product. In this manner, the Thompson et al. process effectively provides a closed loop of contamination, but alleges a high purity ammonium sulfate product. This result is not possible based on the process illustrated and taught in this patent.

Figure 2:
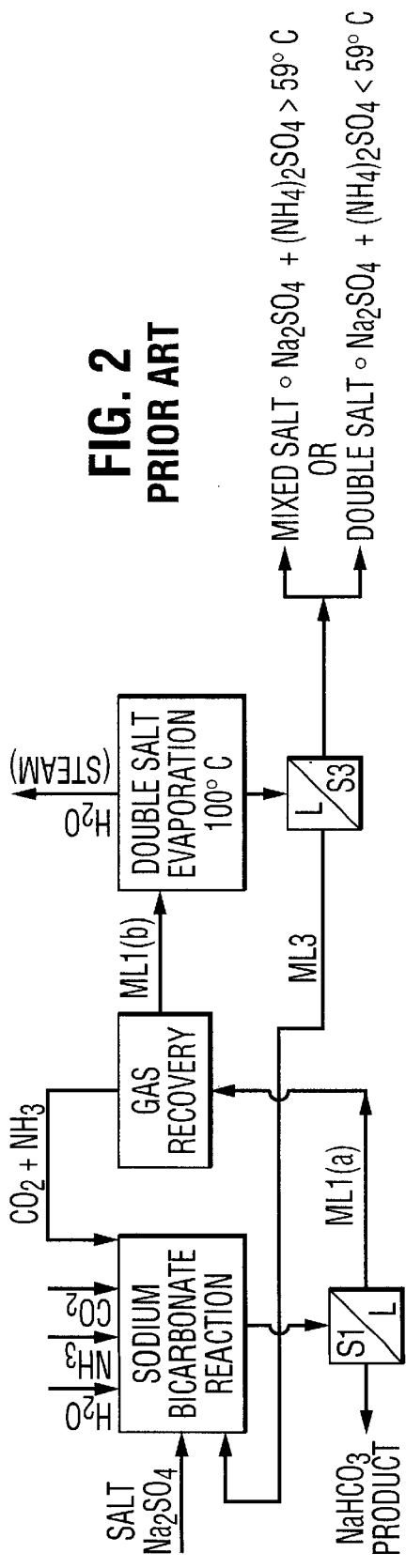
FIG. 2 is another process flow diagram according to the prior art.

The Stiers et al. process flow chart depicted in FIG. 2 simply shows a process for generating a double salt or a mixed salt based on similar ingredients initially introduced in the well known sodium bicarbonate reaction. The teachings of this reference simply establish what has been known for decades and provide no instruction to the skilled man with respect to ammonium sulfate synthesis.

Figure 3:
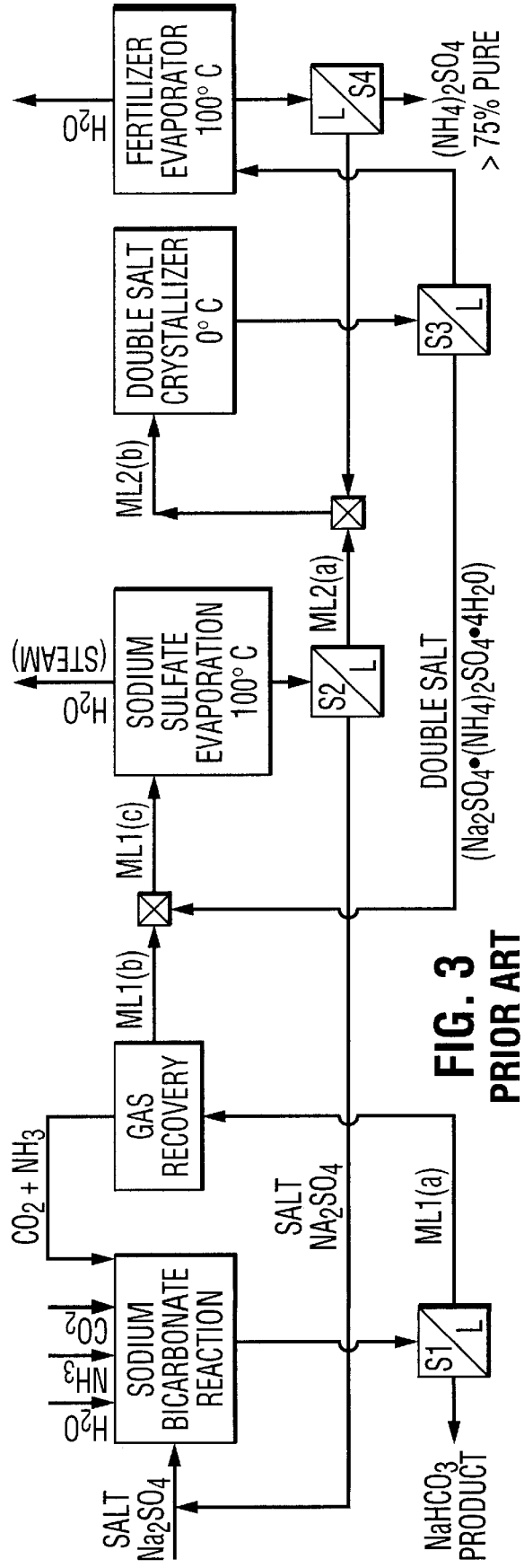
FIG. 3 is a further process flow diagram according to the prior art.

In FIG. 3, the Kresnyak et al. process is shown. The process relies on significant energy input to heat the solution to result in the precipitation of sodium sulfate and formulates massive amounts of double salt precipitate relative to ammonium sulfate solution (2:1 ratio). The process, having clear utility and merit, does not embrace a key step necessary to avoid high energy expenditures and increase ammonium sulfate production; the addition of sodium sulfate to saturate the solution which was undersaturated. This concept results in the further availability of sodium and sulfate for enhanced ammonium sulfate and sodium bicarbonate yields.

Figure 4:
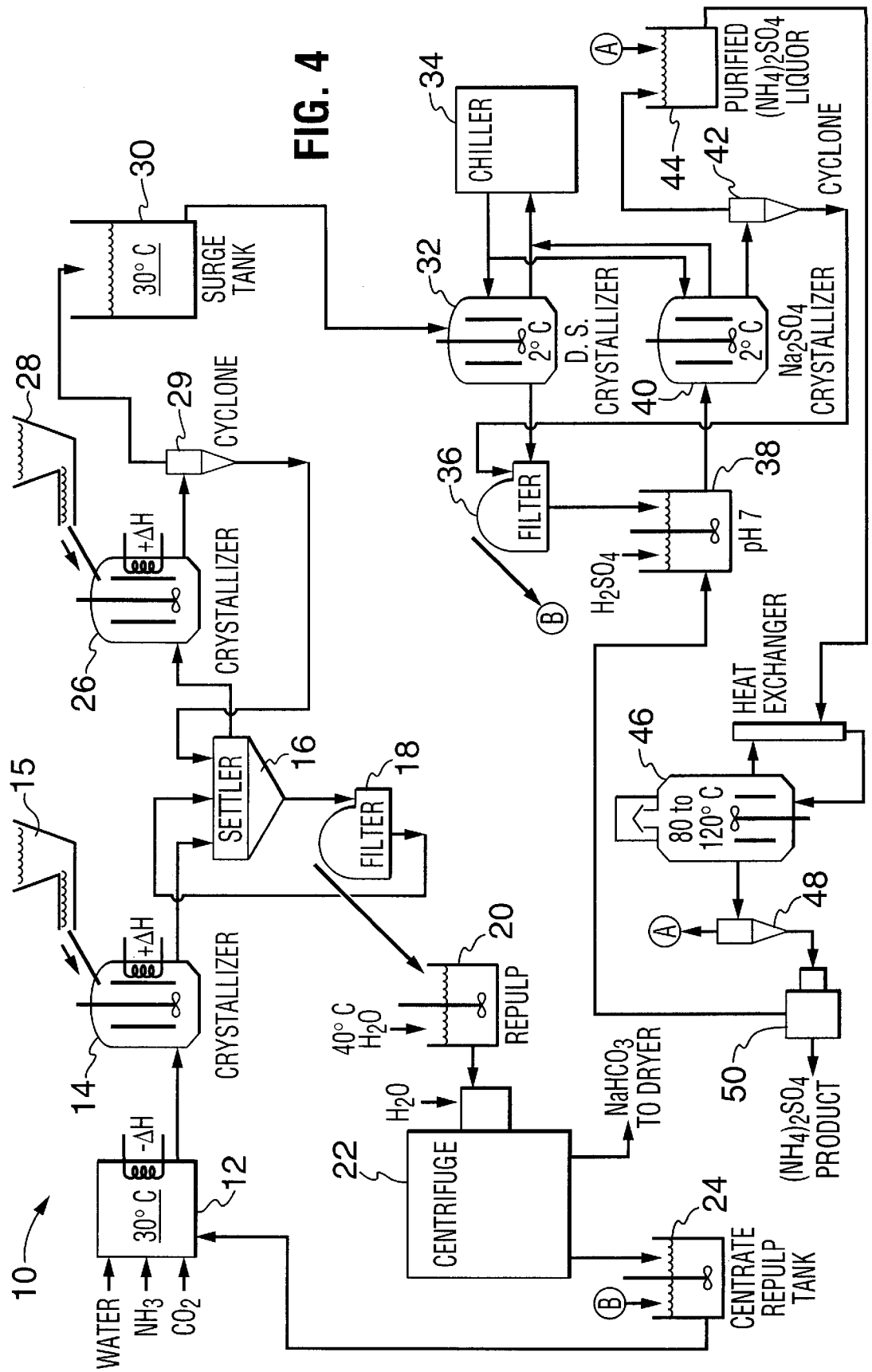
FIG. 4 is a process flow diagram according to one embodiment of the present invention.

In FIG. 4, the overall process in accordance with a first embodiment is illustrated and globally referenced as 10. Initially, water, ammonia or a source of ammonium ions and carbon dioxide are mixed in vessel 12 to form ammonium bicarbonate. The vessel may be heated to a temperature of between 20° C. and 50° C. and preferably to 30° C. The mixture undergoes two individual precipitation operations in order to maximize the removal efficiency of the sodium bicarbonate. In the first operation, the ammonium bicarbonate is passed into a crystallization vessel 14 to which is added sodium sulfate from a source 15 thereof in order to formulate sodium bicarbonate. At this point the solution contains approximately 22% by weight sodium bicarbonate. The bicarbonate is passed on to a settler 16 and filter 18. The solution, after having been filtered, has a composition of, by weight, between 13%–15% ammonium sulfate, between 13%–15% sodium sulfate and between 8% and 12% sodium bicarbonate. The solution is then repulped with the introduction of water at 40° C. in vessel 20. The mixture is then centrifuged and washed by centrifuge 22 with the sodium bicarbonate subsequently dried in a drying stage. The filtrate remaining is passed into vessel 24 and subsequently reintroduced to vessel 12.

After having been centrifuged and washed, the sodium bicarbonate comprises 99.80% $NaHCO_3$ with occluded $Na_2SO_4$ in a concentration of 600 ppm. By further processing (FIG. 5), the bicarbonate can be converted to United States Pharmacopoeia standards and thus has a composition as follows:

| Sodium Bicarbonate (USP Grade Specification) Dry Basis | |
|---|---|
| Sodium Bicarbonate | >99.9x wt % |
| Sodium Carbonate | <xx ppm |
| Insolubles | <xx ppm |
| Calcium (as Ca) | <xx ppm |
| Magnesium (as Mg) | <xx ppm |
| Chloride (as Cl) | <xx ppm |
| Sulfate (as $SO_4$) | <xx ppm |
| Silica (as Si) | <xx ppm |
| Aluminum (as Al) | <xx ppm |
| Moisture Content | <xx wt % |

The filtrate remaining at the settler 16 is passed on to a second crystallization vessel 26 to which is added anhydrous sodium sulfate from a source 28 thereof. This is the second sodium bicarbonate precipitation operation. At this stage, the solution contains approximately 15% to 16% sodium bicarbonate crystals. The solution and precipitated sodium bicarbonate are passed into a separation device, shown in the example as a cyclone 29, with the solids being reintroduced to settler 16 and the filtrate or solution passed into a vessel 30 at a temperature of between 35° C. and 50° C. It is most desirable for this operation on the solution to be conducted at 38° C. The composition of the solution at this point is, by weight, between 18% and 28% ammonium sulfate, 5% and 10% sodium sulfate and approximately 8% sodium bicarbonate.

The addition of the anhydrous sodium sulfate as discussed above contributes to the success of the procedure and is a feature that was not appreciated in the prior art as discussed herein supra. This facilitates saturation of the solution with respect to ammonium sulfate. This is a marked difference over the prior art; at this stage in the prior techniques the ammonium sulfate concentration was approximately 13% by weight (Kresnyak et al., supra) demonstrating that the addition of the sodium sulfate is contributory in the present invention to an improved ammonium sulfate concentration. This feature has significant consequences in the process and leads to higher yields of ammonium sulfate product, without contamination problems or increased evaporative load.

By the processing of the solution or filtrate prior to this operation, the solution is under saturated with respect to the sodium sulfate and thus addition of the sodium sulfate augments the saturation of the ammonium sulfate. The solution is passed into a double salt crystallizer 32 cooled by cooler 34 at a temperature of between −5° C. and 2° C. and most desirably 2° C. The temperature may be as low as −15° C., but there is a practical limit since ammonium sulfate saturation decreases with lower temperatures thus hampering the economics of the process. The solids are filtered by filter 36 to form a cake. The cake contains water and approximately, by weight, 30% sulfur, 10% sodium and 5% nitrogen and may be recycled to vessel 24. The solution contains, approximately by weight, 6% sodium bicarbonate, 5% sodium sulfate and between 25% and 35% ammonium sulfate. At this stage, the solution could be heated to about 95° C. to liberate ammonia or carbon dioxide gas.

As a second possibility, the solution is passed into vessel 38 and contacted with sulfuric acid to degas any remaining carbonate minerals from the sodium bicarbonate. This is generally referred to as "bicarbonate kill" in the art. These steps are generally referenced by numeral 31 in FIG. 5. The solution remaining is passed to a sodium sulfate crystallization vessel 40 at a temperature in the range as stated with respect to the double salt crystallizer 32 and preferably 2° C. and cycloned in cyclone 42. Solids are recycled to filter 36 and the solution, which is now purified ammonium sulfate liquor, stored in vessel 44. At this point, the solution contains between 3% and 5% by weight sodium sulfate and as such there is a significant amount of ammonium sulfate present relative to the sodium sulfate. In view of this difference, vast amounts of ammonium sulfate solid can be produced by evaporation in evaporator 46 without contamination by sodium sulfate. This is achievable since the double salt point (16% by weight) sodium sulfate is clearly avoided by the 3%–5% by weight sodium content. Accordingly, evaporation at approximately 110° C. avoids sulfate contamination to ensure process control and product quality.

The solid product and remaining liquid are passed into cyclone 48 with the solid ammonium sulfate exiting dryer 50 and any liquid transferred to vessel 44 for recycle as indicated by A in the FIG. 4. The ammonium sulfate product from dryer 50 contains less than 0.5% by weight sodium sulfate and as such is substantially improved product over that synthesized in the prior art.

Figure 5:
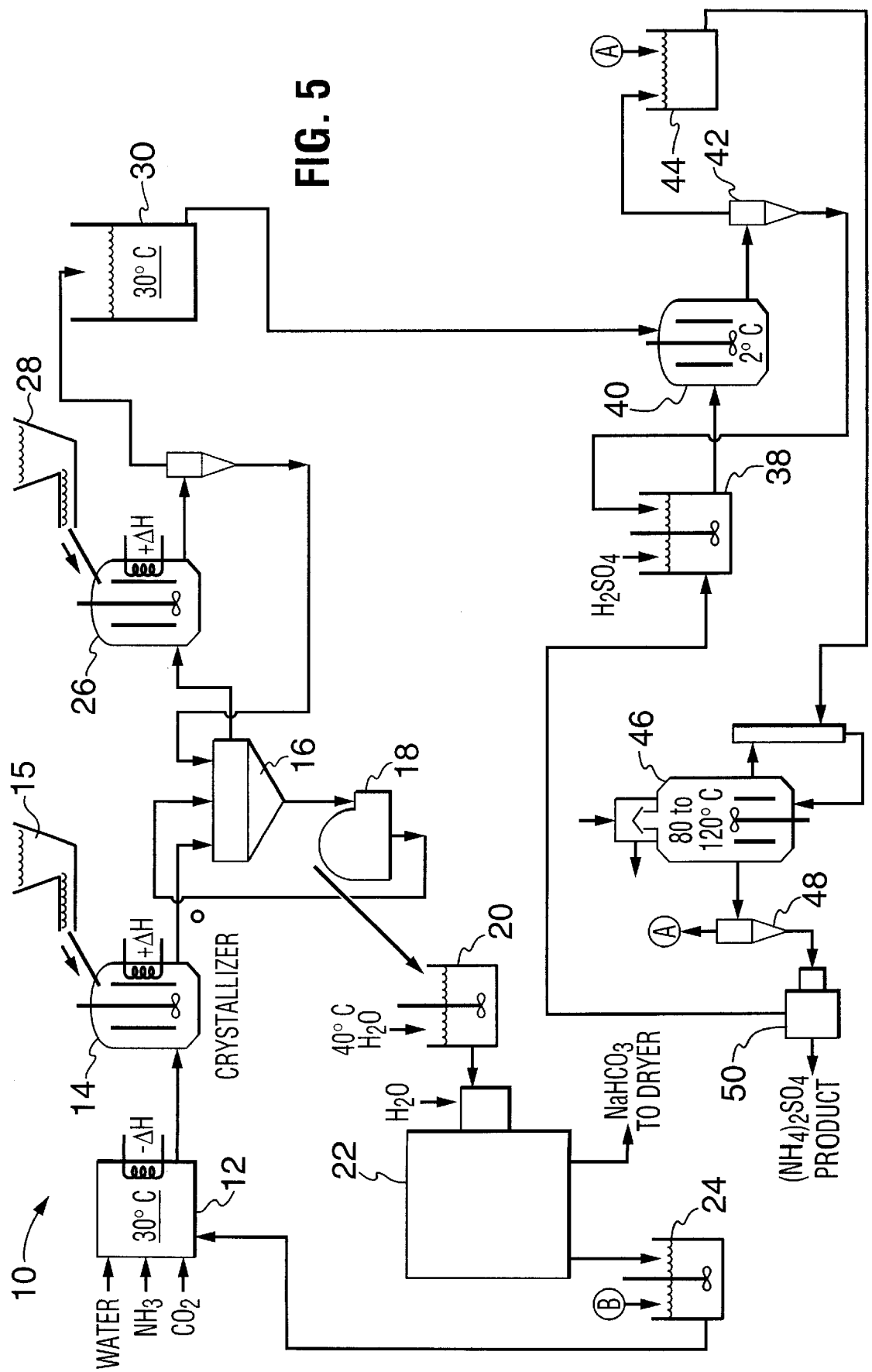
FIG. 5 is a further embodiment of the process of the present invention Similar numerals in the figures denote similar elements.

Turning to FIG. 5, the process flow diagram illustrates a variation of the process set forth in FIG. 4. In this embodiment, the double salt crystallizer 32 is eliminated and excess sulfuric acid employed to reduce sodium bicarbonate in solution. This process variation is an economically viable alternative where the sulfuric acid can be provided inexpensively. In this process, the solution from vessel 30 is heated to 95° C. to release $CO_2$ and $NH_3$ gas and the degassed solution subsequently cooled to 0° C. This is then passed into sodium sulfate crystallization vessel 40 with the remaining steps of the process following in accordance the procedure established with respect to FIG. 4.

As an example of the process, the following demonstrates the success of the methodology.

EXAMPLE 1

Solid Crystals of $NH_4HCO_3$

Feed 1 liter of $Na_2SO_4$ saturated brine @ 38° C. S.G. 1.300

One liter of brine contains 390 g of $Na_2SO_4$ in solution.

Assume Perfect S/L separations

First Step

| | |
|---|---|
| 390 g/l $Na_2SO_4$ + 263.7 g $NH_4HCO_3$ Product #1 | 150 g/l $Na_2SO_4$ + 223 g $(NH_4)_2SO_4$ + Reaction 125 g/l $NaHCO_3$ + 160 g $NaHCO_3$(5) |

The exit brine is now 1.250 S.G. at 38° C.

This brine is then resaturated with $Na_2SO_4$

S.G. of brine 1.34 @ 38° C.
150 g of $Na_2SO_4$ is added to brine.
    Composition is now: 300 g/l $Na_2SO_4$
                     : 223 g/l $(NH_4)_2SO_4$ @ 1.340 S.G.
                     : 125 g/l $NaHCO_3$ Second Step
   Now: 190 g $NH_4HCO_3$ is added

| Brine Composition: | Product |
|---|---|
| : 384 g/l $(NH_4)_2SO_4$ | 204.6 g Reaction product #2 |
| : 127 g/l $Na_2SO_4$ | + 22.2 Saturation Reduction |
| : 102.8 g/l $NaHCO_3$ | 226.8 g $NaHCO_3$ |

Reactions #1+#2 Product Recovered: 160+226.8=386.8 g of $NaHCO_3$ per liter of $Na_2SO_4$ feed solution.

Cooling Step:
   The brine is cooled to 0° C. and filtered

| Brine analysis | 1.250 S.G. | Solids |
|---|---|---|
| 62.5 g $Na_2SO_4$ | | 64.5 g $Na_2SO_4$ |
| 350 g $(NH_4)_2SO_4$ | | 34 g $(NH_4)_2SO_4$ |
| 75 g $NaHCO_3$ | | 27.8 g $NaHCO_3$ |

The solids are a wet cake solids and contain the hydrates of $Na_2SO_4$, $(NH_4)_2SO_4$, and $NaHCO_3$ which is recycled to Step 1 or Step 2

| | | |
|---|---|---|
| This wet cake is: | $Na_2SO_4$—10$H_2O$ = | 144.7 g |
| | $(NH_4)_2SO_4$ —8$H_2O$ = | 71.2 |
| | $NaHCO_3$—10$H_2O$ = | 87.4 |
| Hydrates of $H_2O$ are assumed: | | 303. g |

These hydrates are a convenient way to remove water for recycle which reduce evaporation load.

Total $NaHCO_3$ recovered is: 409+27.8+436.8 g

Conversion efficiency of process of $Na_2SO_4$ to $NaHCO_3$ is:

$$\text{Feed} = 540 \text{ g}; \text{Brine exit} = 62.5 \text{ g} + \frac{75}{84_{(2)}} \times 142 \text{ } (Na_2SO_4 \text{eg.})$$

$$\text{Brine exit} = 126 \text{ g}$$

Circuit Efficiency = 76.6%

Bicarb Kill 62.5 g $Na_2SO_4$
350 g $(NH_4)_2SO_4$ +43.7 g $H_2SO_4 \rightarrow CO_2$
75 g $NaHCO_3$
New brine composition.

126 g $Na_2SO_4$+ heat solution of $H_2SO_4$
350 g $(NH_4)_2SO_4$
This solution is again cooled to 0° C.

| 1.24 S.G. | | Glauber's |
|---|---|---|
| 62.5 g $Na_2SO_4$ | + | 143 g $Na_2SO_4$ $10H_2O$ |
| 350 g $(NH_4)_2SO_4$ | | |
| 827.5 g $H_2O$ | | |

The Glauber's salt is recycle to Step 1 or 2.
The Brine is evaporated until 16% $Na_2SO_4$ in exit Brine is achieved @ 60° C. S.G. 1.320

| | | |
|---|---|---|
| 70 g $Na_2SO_4$ | | |
| 122.5 g $(NH_4)_2SO_4$ | yield $(NH_4)_2SO_4$ = 227.5 g/l of evaporator feed | |
| 245 g $H_2O$ | | |
| 437.5 g total | | |

The brine is recycled to the bicarbonate kill to cooled to remove $Na_2SO_4$

EXAMPLE 2

As will be evident, the process is particularly well suited to desulfurizing a sulfur containing streams. The stream simply is exposed to oxidizing conditions to generate a sulfur containing compound which is subsequently contacted with sodium bicarbonate to formulate sodium sulfate. In this regard U.S. Pat. Nos. 5,830,422 and 5,654,351 are incorporated herein by reference. Oxidation of $SO_3$ to $SO_4$ can be accomplished with air sparging or use of an oxidant-like peroxide or ozone. Also, metals can be precipitated with simple CO3 or sulfide reductions and filtration.

$NH_4HCO_3$(using $Na_2SO_4$ anhydrite)
Saturated solution of $NH_4HCO_3$ @ 30° C. holds 263.7 g/l $NH_4HCO_3$
Therefore:

1 l solution + 390 g $Na_2SO_4 \rightarrow \Delta H$
150 g $Na_2SO_{4(l)}$ + 223 g $(NH_4)_2SO_{4(l)}$ + 125 g $CO_{3(l)}$ + 160 g $NaHCO_{3(s)}$
$\Delta H$ add heat
(l) liquid
(s) solid The brine is resaturated with 150 g $Na_2SO_4$ to yield a brine of 1.34 @ 38° C.
$NH_3+CO_2$ can be added as gas or as a $NH_4HCO_3$ solid to complete the reaction.
Now 190 g $NH_4HCO_3$ is added.

| New Brine composition | Product |
|---|---|
| 384 g/l $(NH_4)_2SO_4$ | 204.6 g $NaHCO_3$ |
| 127 g/l $Na_2SO_4$ | |
| 80 g/l $NaHCO_3$ | |

Primary Process yield 160+204.6=364.6 g $NaHCO_3$

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method of recovering purified ammonium sulfate solution from a solution of sodium sulfate, carbon dioxide, ammonia or ammonium ions, comprising the steps of:
   a) precipitating, in at least one precipitation operation, sodium bicarbonate precipitate to reduce the sodium bicarbonate concentration in solution, said solution containing ammonium sulfate and removing the sodium bicarbonate precipitate out of the solution;
   b) centrifuging and washing said sodium bicarbonate precipitate to convert said precipitate to industrial grade sodium bicarbonate;
   c) saturating said solution from step a) with one of sodium sulfate or ammonium bicarbonate by addition of said sodium sulfate or said ammonium bicarbonate to said solution at a temperature of between 35° C. and 50° C. to form a second precipitate of sodium bicarbonate, which is removed from the solution;
   d) conditioning said solution from step c) by at least one of heating said solution to 95° C. to liberate ammonia and carbon dioxide and contacting said solution from step c) with sulfuric acid to decompose any carbonate minerals;
   e) cooling solution from step d) at a temperature between −2° C. and 2° C. to form a third precipitate of sodium bicarbonate in the absence of double salt formation;
   f) recycling precipitates from steps c) and e) to step a);
   g) treating solution from step e) with sulfuric acid to decompose any remaining carbonate minerals from sodium bicarbonate and reducing said sodium sulfate to less than 7% by weight; and subsequently
   h) recovering purified ammonium sulfate solution.

2. The method as set forth in claim 1, further including the step of heating said solution from step g) to about 95° C. to liberate ammonia and carbon dioxide.

3. The method as set forth in claim 1, wherein said step of recovering purified ammonium sulfate solution further includes cooling said solution to a temperature of between −5° C. and 2° C.

4. The method as set forth in claim 3, wherein said solution is cooled to a temperature of between −2° C. and 2° C.

5. The method as set forth in claim 3, wherein said cooling results in the precipitation of Glauber's salt.

6. The method as set forth in claim 5, further including the step of filtering said Glauber's salt to provide a solution of ammonium sulfate.

7. The method as set forth in claim 5, further including the step of liberating carbon dioxide gas during cooling.

8. The method as set forth in claim 6, wherein said solution of ammonium sulfate contains less than 5% by weight sodium sulfate.

9. The method as set forth in claim 6, wherein said solution of ammonium sulfate is evaporated to form an ammonium sulfate solid.

10. The method as set forth in claim 9, wherein said ammonium sulfate solid contains less than 0.5% by weight sodium sulfate.

11. A method of recovering purified ammonium sulfate solution from a solution of sodium sulfate, carbon dioxide, ammonia or ammonium ions, comprising the steps of:

a) precipitating, in at least one precipitation operation, sodium bicarbonate precipitate to reduce the sodium bicarbonate concentration in solution, said solution containing ammonium sulfate and removing the sodium bicarbonate precipitate out of the solution;

b) centrifuging and washing said sodium bicarbonate precipitate to convert said precipitate to industrial grade sodium bicarbonate;

c) saturating said solution from step a) with one of sodium sulfate or ammonium bicarbonate by addition of said sodium sulfate or said ammonium bicarbonate to said solution at a temperature of between 35° C. and 50° C. to form a second precipitate of sodium bicarbonate, which is removed from the solution;

d) conditioning said solution from step c) by at least one of heating said solution to 95° C. to liberate ammonia and carbon dioxide and contacting said solution from step c) with sulfuric acid to decompose any carbonate minerals;

e) cooling solution from step d) at a temperature between −2° C. and 2° C. to form a third precipitate of sodium bicarbonate in the absence of double salt formation;

f) recycling precipitates from steps c) and e) to step a);

g) heating said solution from step e) to a temperature of 95° C. to convert residual sodium bicarbonate to sodium sulfate and release ammonia and carbon dioxide for recycle to step a); and subsequently h) recovering purified ammonium sulfate solution.

12. A method of forming ammonium sulfate from sodium sulfate and sodium bicarbonate, comprising the steps of:

a) providing a solution of sodium sulfate;

b) contacting said sodium sulfate solution with carbon dioxide and ammonia or ammonium ions to form a first precipitate of sodium bicarbonate and a solution containing ammonium sulfate;

c) progressively precipitating sodium bicarbonate to reduce the sodium bicarbonate concentration in solution, said solution containing ammonium sulfate;

d) recovering as a product said first precipitate of sodium bicarbonate;

e) centrifuging and washing said first precipitate of sodium bicarbonate to convert said sodium bicarbonate into industrial grade sodium bicarbonate;

f) treating solution remaining from d) with sodium sulfate at a temperature of between 35° C. and 50° C. to form a second precipitate of sodium bicarbonate;

g) recovering said second precipitate of sodium bicarbonate and recycling recovered second precipitate to step b);

h) conditioning said solution from step g) by at least one of heating said solution to 95° C. to liberate ammonia and carbon dioxide and contacting said solution from step g) with sulfuric acid to decompose any carbonate minerals;

i) cooling solution remaining from step h) to a temperature of between −5° C. and 2° C. to form a third precipitate of sodium bicarbonate, and precipitates of sodium sulfate and ammonium sulfate in the absence of double salt formation;

j) recovering said third precipitate of sodium bicarbonate and precipitates of sodium sulfate and ammonium sulfate from said solution of step i) and recycling recovered third precipitate and said precipitates of sodium sulfate and ammonium sulfate to step b);

k) treating solution remaining from step j) with sulfuric acid to decompose any remaining carbonate minerals from sodium bicarbonate and reducing said sodium sulfate to less than 7% by weight; and subsequently l) recovering purified ammonium sulfate solution.

13. The method as set forth in claim 12, wherein the solution containing said first precipitate of sodium bicarbonate comprises at least 22% by weight sodium bicarbonate.

14. The method as set forth in claim 12, wherein said solution from step d) contains between 18% and 28% ammonium sulfate, between 5% and 15% sodium sulfate and at least 12% sodium bicarbonate.

15. The method as set forth in claim 12, wherein said solution form step d) is treated at a temperature of 38° C.

16. The method as set forth in claim 12, wherein solution from step j) contains between 25% and 35% ammonium sulfate and between 3% and 5% sodium sulfate.

17. The method as set forth in claim 16, wherein said solution is evaporated to concentrate ammonium sulfate as a solid product.

18. A method of forming ammonium sulfate from sodium sulfate and sodium bicarbonate, comprising the steps of:

a) providing a solution of sodium sulfate;

b) contacting said sodium sulfate solution with carbon dioxide and ammonia or ammonium ions to form a first precipitate of sodium bicarbonate and a solution containing ammonium sulfate;

c) progressively precipitating sodium bicarbonate to reduce the sodium bicarbonate concentration in solution, said solution containing ammonium sulfate;

d) recovering as a product said first precipitate of sodium bicarbonate;

e) centrifuging and washing said first precipitate of sodium bicarbonate to convert said sodium bicarbonate into industrial grade sodium bicarbonate;

f) treating solution remaining from d) with sodium sulfate at a temperature of 38° C. to form a second precipitate of sodium bicarbonate;

g) recovering said second precipitate of sodium bicarbonate and recycling recovered second precipitate to step b);

h) conditioning said solution from step g) by at least one of heating said solution to 95° C. to liberate ammonia and carbon dioxide and contacting said solution from step g) with sulfuric acid to decompose any carbonate minerals;

i) cooling solution remaining from step h) to a temperature of 2° C. to form a third precipitate of sodium bicarbonate, and precipitates of sodium sulfate and ammonium sulfate in the absence of double salt formation;

j) recovering said third precipitate of sodium bicarbonate and precipitates of sodium sulfate and ammonium sulfate from said solution of step i) and recycling recovered third precipitate and said precipitates of sodium sulfate and ammonium sulfate to step b);

k) treating solution remaining from step j) with sulfuric acid to decompose any remaining carbonate precipitates from sodium bicarbonate and reducing said sodium sulfate to less than 7% by weight;

l) removing precipitates formed in said solution from step k); and m) recovering purified ammonium sulfate solid.

19. The method as set forth in claim 18, wherein said ammonium sulfate solid contains 0% by weight sodium sulfate.

20. A method of forming ammonium sulfate from sodium sulfate and sodium bicarbonate, comprising the steps of:

a) providing a solution of sodium sulfate;

b) contacting said sodium sulfate solution with carbon dioxide and ammonia or ammonium ions to form a first precipitate of sodium bicarbonate and a solution containing ammonium sulfate;

c) progressively precipitating sodium bicarbonate to reduce the sodium bicarbonate concentration in solution, said solution containing ammonium sulfate;

d) recovering as a product said first precipitate of sodium bicarbonate;

e) centrifuging and washing said first precipitate of sodium bicarbonate to convert said sodium bicarbonate into pharmaceutical grade sodium bicarbonate;

f) treating solution remaining from d) with sodium sulfate at a temperature of between 35° C. and 50° C. to form a second precipitate of sodium bicarbonate;

g) conditioning said solution from step f) by at least one of heating said solution to 95° C. to liberate ammonia and carbon dioxide and contacting said solution from step f) with sulfuric acid to decompose any carbonate minerals;

h) cooling solution from step (g) to a temperature of between −5° C. and 2° C. to further precipitate of sodium bicarbonate, and form precipitates of sodium sulfate and ammonium sulfate in the absence of double salt formation;

i) treating said solution, said precipitate of sodium bicarbonate and said precipitates of sodium sulfate and ammonium sulfate from step h) with sulfuric acid to precipitate remaining sodium bicarbonate;

j) recovering said precipitate of sodium bicarbonate and precipitates of sodium sulfate and ammonium sulfate from said solution of step i) and recycling recovered sodium bicarbonate precipitate and said precipitates of sodium sulfate and ammonium sulfate to step b); and k) recovering purified ammonium sulfate solution.

21. The method as set forth in claim 20, further including the step of evaporating said purified ammonium sulfate solution to form a solid ammonium sulfate product.

22. The method as set forth in claim 21, wherein said solid ammonium sulfate contains 0% by weight sodium sulfate.

* * * * *